(12) United States Patent
Ames et al.

(10) Patent No.: US 6,922,249 B1
(45) Date of Patent: Jul. 26, 2005

(54) BEAM MASKING TO REDUCE CYCLIC ERROR IN BEAM LAUNCHER OF INTERFEROMETER

(75) Inventors: Lawrence L. Ames, San Jose, CA (US); Raymond Mark Bell, Redwood City, CA (US); Kalyan Dutta, Santa Clara, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 303 days.

(21) Appl. No.: 10/293,209

(22) Filed: Nov. 12, 2002

(51) Int. Cl.⁷ .................................................. G01B 9/02
(52) U.S. Cl. ...................................................... 356/496
(58) Field of Search ................................ 356/485, 486, 356/487, 492, 496

(56) References Cited

U.S. PATENT DOCUMENTS

| | | |
|---|---|---|
| 4,514,850 A | 4/1985 | Holmes et al. |
| 5,090,803 A | 2/1992 | Ames et al. |
| 5,291,570 A | 3/1994 | Filgas et al. |
| 5,452,392 A | 9/1995 | Baker et al. |
| 6,483,982 B1 | 11/2002 | Takahashi |
| 6,646,723 B1 * | 11/2003 | Dubovitsky et al. ......... 356/4.1 |
| 6,710,880 B1 | 3/2004 | Zhao |

FOREIGN PATENT DOCUMENTS

WO    WO 3021319 A2    3/2003

OTHER PUBLICATIONS

Ames, Lawrence, et al., "SIM external metrology beam launcher (QP) development," Lockheed Martin Advanced Technology Ctr./ Lockheed Martin Jet Propulsion Lab, SPIE Conference, Kona Hawaii, 2002 (4852–55).

Halverson, Peter G,, et al., "Techniques for the Reduction of Cyclic Errors in Laser Metrology Gauges for the Space Interferometry Mission," presented at American Society for Precision Engineering ASPE's 16th Annual Meeting, Nov. 10–15, 2001.

Zhao, Feng, et al. "Development of Sub–nanometer Racetrack Laser Metrology for External Triangulation Measurement for the Space Interfarometry Mission", presented at American Society for Precision Engineering ASPE's 16th Annual Meeting, Nov. 10–15, 2001.

* cited by examiner

Primary Examiner—Gregory J. Toatley, Jr.
Assistant Examiner—Michael A. Lyons
(74) Attorney, Agent, or Firm—McDermott Will & Emery LLP

(57) ABSTRACT

Embodiments of the present invention are directed to reducing cyclic error in the beam launcher of an interferometer. In one embodiment, an interferometry apparatus comprises a reference beam directed along a reference path, and a measurement beam spatially separated from the reference beam and being directed along a measurement path contacting a measurement object. The reference beam and the measurement beam have a single frequency. At least a portion of the reference beam and at least a portion of the measurement beam overlapping along a common path. One or more masks are disposed in the common path or in the reference path and the measurement path to spatially isolate the reference beam and the measurement beam from one another.

23 Claims, 12 Drawing Sheets

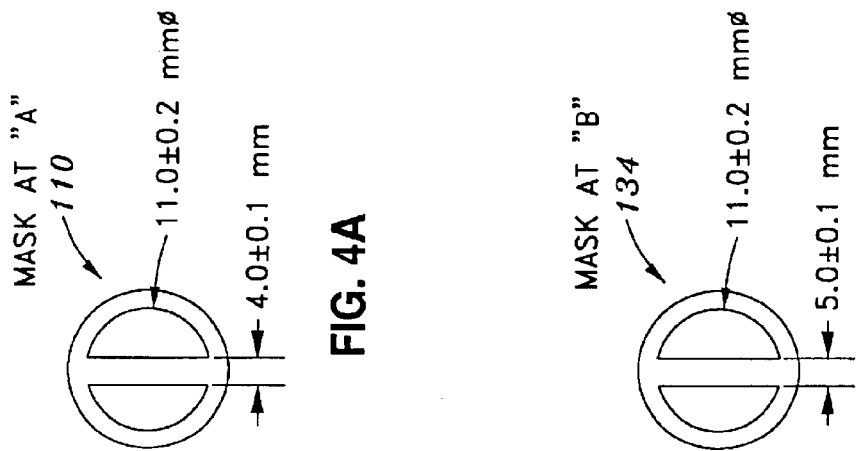
FIG. 4A
FIG. 4B
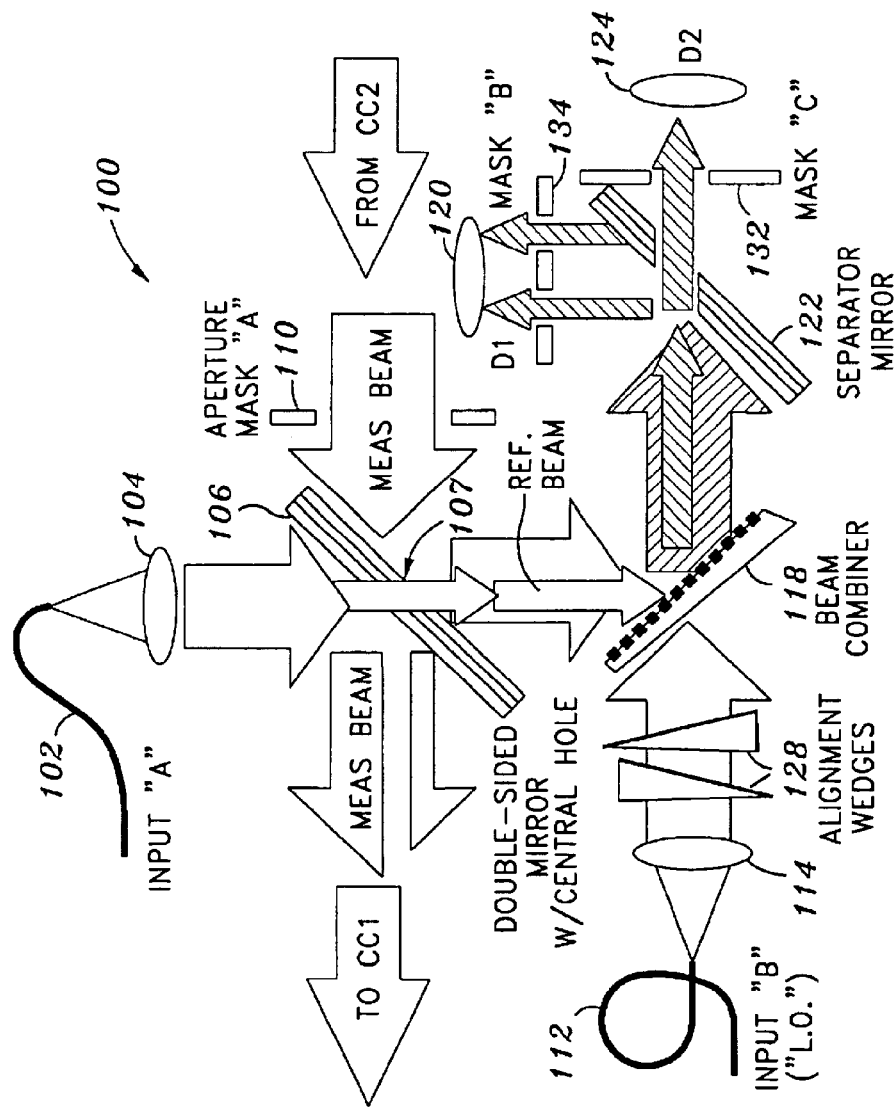
FIG. 4

BEAM MASKING TO REDUCE CYCLIC ERROR IN BEAM LAUNCHER OF INTERFEROMETER

STATEMENT AS TO RIGHTS TO INVENTIONS MADE UNDER FEDERALLY SPONSORED RESEARCH OR DEVELOPMENT

The invention described herein was made in the performance of work under NASA Contract No. JPL 1000016 and is subject to provisions of Section 305 of the National Aeronautics and Space Act of 1958 (42 U.S.C. 2457).

CROSS-REFERENCES TO RELATED APPLICATIONS

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to reflecting structures and, more particularly, to reducing cyclic error in a beam launcher for an interferometer.

Precision laser interferometry is used to precisely measure the distance between two fiducial points, such as corner cube retro-reflectors ("retros"). An interferometer typically includes three components: (1) a radiation source (e.g., a laser), (2) a beam launcher, and (3) a signal processor (e.g., an observer or a photo-detector and associated electronic circuits). In some configurations, the photo-detector is included in the beam launcher component, while much of the supporting electronics (e.g., the phase meter(s) and computer) remain with the signal processor.

Some existing beam launchers for interferometers do not produce collinear antiparallel beams. Alternatively, if the launchers do produce collinear antiparallel beams, the launchers suffer from problems including thermal drift, cross talk, beam-walk, and/or non-common-path optics, among others.

Some existing launchers that do not produce collinear antiparallel beams sometimes function by directing a single beam towards a first one of the retros. The single beam hits the first retro at a point offset from a vertex of the retro. The retro-reflected beam emerges from the first retro at a symmetrically located offset point, and the beam then is directed to a second retro. The beam and retros are positioned and aligned such the reflected beam hits the second retro also offset from the vertex, with the emerging beam doubly reflected back to an entrance point on the launcher. Such a circuitous configuration is sometimes referred to as a "racetrack" configuration. Any imperfection in the construction of a retro can affect the orientation of the individual facets of the retro, which can cause the retro-reflected beam to emerge at a deflected angle, giving a "dihedral" error that affects the measured distance. If, in addition, the retro or launcher moves in such a manner as to cause a lateral beam displacement, this displacement times the deflection angle results in an error in the measured distance (an example of a "beam-walk" error). Other considerations are size limitations. For instance, the acceptance aperture of the retro has to be at least twice, and often multiple times, the diameter of the measurement laser beam.

An alternative to the racetrack configuration is a "vertex—vertex" configuration, in which beam(s) follow paths described by an ideal line connecting the vertices of the two retros. This can be accomplished by the use of a single beam that leaves the beam launcher, interrogates the first retro, passes back through the beam launcher, interrogates the second retro, and then returns once again to the beam launcher. Alternatively, the beam launcher can emit two distinct beams, each of which interrogates one retro.

An advantage of the vertex—vertex configuration is that the aperture of the retro does not need to be significantly larger than the diameter of the laser beam. Another advantage of this configuration is that by being centered on the vertex, different portions of the beam hit different facets of the retro in different sequences, and the resulting dihedral errors cancel out to some degree. On the other hand, the vertex—vertex configuration may have a greater sensitivity to irregularities of the retros' reflective surfaces near the edges of the facets as compared to the racetrack configuration. The vertex—vertex also lacks the ability to have two independent launchers measure the distance between a given pair of fiducials, as may be required by redundancy considerations.

Precision laser interferometry can be carried out in at least two modes, namely, the "homodyne" mode or the "heterodyne" mode. Either mode can be used for either the racetrack configuration or the vertex—vertex configuration. A vertex—vertex configuration that utilizes two distinct measurement beams requires two complete sets of the elements.

In the homodyne mode, a beam launcher splits a laser beam of a single frequency into two beams. One beam is directed out to the retro(s) to measure the distance. Upon returning to the beam launcher, the beam is aligned and collocated (and the polarization aligned, if needed) with the other portion of the original beam, and the resulting combined beam is directed onto a photo-detector. If the extra distance traveled by the measurement beam is an integer multiple of half the laser wavelength, then, when recombined, the two beams are in phase and add constructively, resulting in an increased signal from the photo-detector. If the measurement beam is an odd multiple of a quarter of the wavelength longer, the beams add destructively, resulting in a reduced signal from the photo-detector. If the distance between the retros changes, the signal fluctuates, and the fluctuations in the signal give a measure of the relative motion of the retros. A signal processor (e.g., an observer or a photo-detector and electronic circuit) "counts fringes" to determine the change in distance between the retros relative to an initial distance. The resolution of a homodyne interferometer is limited, as it is difficult to measure changes in distance significantly smaller than the laser wavelength (typically a half to several micrometers) due to intensity fluctuations of the laser.

A heterodyne interferometer configuration uses two beams that have each been offset in frequency to slightly different frequencies. Typically, the beams originate from a single laser. The difference between the frequencies is chosen to be convenient for detectors and electronics. Typically, the frequency difference is in the range of about 10 kHz to about 100 MHz. Typically, one frequency-offset laser beam (the "measurement beam") emanates from the beam launcher to interrogate the distance to the retro(s) while the second frequency-offset laser beam (the "local oscillator" or LO) beam remains internal to the beam launcher. When the measurement beam and the LO beam are aligned, collocated, and with aligned polarizations, and are directed onto the photo-detector, the photo-detector produces a "beat" signal. By comparing this beat signal to the known difference of frequency offsets between the laser beams, it is possible to track changes in the relative phase of the signal to find the change in retro distance relative to the initial value. With precision phase meters, it is possible to resolve distances to small fractions of the laser wavelength, resulting in measurements with sub-nanometer precision.

When measuring distances with fine precision, various error sources can affect the results. The laser intensity can fluctuate. The laser radiation is often routed to the beam launcher by means of optical fibers. Small effects, such as a temperature variation or a strain on the fiber, can affect the apparent optical length of the fiber and can result in a phase change that erroneously appears to be a measured displacement of the fiducials. These errors can be reduced by replacing the "known difference" of the laser frequency offsets with a "reference signal" that measures the frequency difference directly. This reference signal is created by mixing a portion of the LO beam with the "reference beam", which is a portion of the first laser beam that does not interrogate the distance between retros, and directing the combined beam onto a second photo-detector. The use of a reference beam significantly reduces the errors introduced by any common element (e.g., laser or fiber), but it cannot correct for elements that are unique to the measurement path or the reference path. Other errors can be reduced by sharing elements between the measurement and LO beams. The measurements are not affected by elements in the beam-path "downstream" from the point where the two laser beams are first combined (the point where they become aligned, like-polarized, and collocated), as the elements are common to both beams. A beam-launcher in the vertex—vertex configuration with two distinct measurement beams may share a single reference signal or may require two distinct reference signals.

FIG. 1 shows an example of an existing implementation of a vertex—vertex launcher 10 that has a single measurement beam and that utilizes polarization to allow the measurement beam to pass through the beam launcher between retros. This launcher has a first laser measurement beam 12 with "S" polarization and a second laser beam 14 that is orthogonally polarized ("P" polarized). The two beams can share much of the optical path. They do not heterodyne because of the orthogonal polarization. A polarizing beam splitter (PBS) 20 transmits radiation with one polarization (e.g., the "P" polarized beam, which is used as the LO beam) and diverts the other beam (e.g., the "S" polarized beam, used as the measurement beam). The diverted beam goes through a first quarter-wave plate 22 (to change the beam polarization to "circular"), out to one of the retros 24, back through the first quarter-wave plate 22 (the beam now has "S" polarization), through the PBS 20, through a second quarter-wave plate 26 (the beam is now circularly polarized again), out to the second retro 28, back through the second quarter-wave plate 26 (now "P" again), and into the PBS 20 where it is then reflected to again become collocated and aligned with the undiverted beam. The two beams then pass through a polarizer 30 that has its polarization axis oriented midway between "P" and "S" which aligns the polarizations of the two beams. At this point, the two beams combine and heterodyne. The resulting combined beam is directed to a detector 32. Portions of the two beams are picked off prior to the PBS, passed through a second polarizer 36, and directed to a second detector 38 to provide the reference signal. One problem with this approach is that the measurement beam experiences optics (e.g., the two quarter-wave plates) are not common to either the LO or reference beams. This introduces errors that do not cancel out. A second problem with this approach is that the beam polarizations and the PBS are not perfect, resulting in "cross talk". Such cross talk contaminates the signal, resulting in a phase shift (measurement error) called "cyclic error" that can make the measured distance longer or shorter than the actual distance.

Some other proposed launcher schemes involve having the measurement and reference beams aligned and adjacent but not concentric. When the beams are mixed with the LO beam, they experience a relative phase shift that is the product of the angular misalignment of the LO beam with respect to the other beams and the offset distance between the centroids of the reference and measurement beams. A constant phase offset is not a problem since all measurements are relative to initial values. However, various optical elements, such as a beam-splitter that combines the LO beam with the measurement and reference beams, may vary the angle of the LO beam as a function of temperature (due to both thermal expansion and changes in the index of refraction with temperature). This changed angle times the centroid offset distance may produce an unacceptably large error.

FIG. 2 shows the basic heterodyne interferometer. The heterodyne configuration is desirable because even minor intensity fluctuations in laser power give unacceptably large phase shifts in the alternative homodyne configuration. A laser beam is routed into an optical fiber 50 and then split. Each beam is frequency-shifted by an acousto-optic modulator ("AOM" 52a, 52b), with some convenient offset frequency between them. The laser light is then routed to the beam launcher 54 (within the dotted line) by an optical fiber network.

Inside the launcher 54, the beams exit the fibers and are collimated (for example, by lenses 56a, 56b), and the two beams then are routed by bean-splitters 58a, 58b (half-reflective mirrors). One beam (the Measurement Beam) interrogates the retro 60, and then upon return is mixed with the other beam (the "local oscillator", or LO beam) to create the heterodyne (beat) signal. This is then detected by a detector 62 and processed, and the resulting signal is compared with the signal that drove the AOMs 52a, 52b.

A problem with this configuration is that it is not accurate enough for some applications. If the optical fiber were stressed by a slight bend, or if the temperature of an optic were to change slightly, this would cause a phase shift that may be small, but that nonetheless is large compared to picometers. FIG. 3 shows one solution that picks off part of the laser light as a "Reference Beam". The same reference characters are used for the same components that are common to both FIGS. 2 and 3. Beam "A" passes through all the fiber distribution networks and collimators, and then a part of the laser beam is broken off (via beam splitter 72 and mirror 74) and mixed with the LO beam ("B") (via beam splitters 76, 78) to recreate the beat signal. The rest of the "A" laser beam is the Measurement Beam that interrogates the retro 60. Each beam is mixed with the LO beam and routed to a detector (62, 82). The resulting signals are compared in the phase meter 84 to give the measurements. This requires about twice as much electronics and optics, but it does measure and compensate for most of the phase errors in the fibers and optics.

Even this is not adequate for some applications. If the path lengths within optics do not match exactly, then even modest changes in temperature can introduce errors. (For example, in the layout in FIG. 3, both beams "A" and "B" pass through two beam-splitter optics before mixing for the measurement channel, but in the reference channel beam "A" goes through an extra piece of glass. Even a milli-Kelvin temperature change could cause a 100 pm error.) Other considerations are that the different optics all have to experience exactly the same temperature (or at least maintain a constant difference), and the relative positions of the optics have to be stable to better than the overall required picometer accuracy.

In short, laser interferometer beam launchers that have non-common, optical paths for the reference and measurement beams suffer from thermal drifts due to even minor thermal gradients. Previous launcher designs with common beam paths have used polarization to separate the measurement and reference channels, but leakage by the polarization elements caused excessive signal contamination that caused excessive cyclic error.

BRIEF SUMMARY OF THE INVENTION

Embodiments of the present invention are directed to reducing cyclic error in the beam launcher of an interferometer. The cyclic error can be caused by cross-talk between various optical paths, such as leakage through a polarizing beam-splitter or by stray-light reflection. Cyclic error manifests itself as an error in the measurement that leads or lags the true measurement as the measured distance changes by generally the length of one wavelength of the laser light. The cyclic error in general cannot be calibrated out as the phase of the error can change with thermal conditions. The inventors discovered another source of signal contamination that resulted from the spatially separated (e.g., co-aligned) beams diffracting into one another. Although the measurement and reference beams are spatially separated, diffraction will cause a small amount of reference beam energy to leak into the measurement beam path and/or a small amount of measurement beam energy to leak into the reference beam path, causing cyclic nonlinearity. To keep this error to less than 10 picometer (pm), the leakage should be kept below about 80 dB. One or more strategically sized and placed masks are used to reduce the amount of light that could diffract from one path into the other. Diffraction models are used to predict the cyclic error of various configuration, and to optimize mask dimension(s) for optimal performance by balancing cross-talk power with signal power to minimize the ratio of contamination to signal. As a result, the one or more masks are sized to block the diffracted contaminant signal while passing the desired measurement or reference beam.

In accordance with an aspect of the present invention, an interferometry apparatus comprises a reference beam directed along a reference path, and a measurement beam spatially separated from the reference beam and being directed along a measurement path contacting a measurement object. The reference beam and the measurement beam have a single frequency. At least a portion of the reference beam and at least a portion of the measurement beam overlapping along a common path. One or more masks are disposed in the common path or in the reference path and the measurement path to spatially isolate the reference beam and the measurement beam from one another.

In some embodiments, a single mask is disposed in the common path to block off a substantial portion of the reference beam which would otherwise diffract into the measurement beam and to block off a substantial portion of the measurement beam which would otherwise diffract into the reference beam. In other embodiments, a plurality of masks comprise a reference beam mask disposed in the reference path to block off the measurement beam and permit a portion of the reference beam to pass therethrough, and a measurement beam mask disposed in the measurement path to block off the reference beam and permit a portion of the measurement beam to pass therethrough. The reference beam mask may comprise an aperture for an inner reference beam, and the measurement beam mask may comprise a pair of apertures disposed on opposite sides of a center separated by a center strip for an annular measurement beam. The pair of apertures of the measurement beam mask may be D-shaped apertures symmetrically disposed with respect to the center strip.

In specific embodiments, the measurement object comprises a pair of corner cube retro-reflectors spaced from one another. A double-sided mirror is disposed between the pair of retro-reflectors, and includes an aperture at or near a center for the reference beam to pass therethrough along the reference path. The measurement path and the reference path are substantially identical except for the portion of the measurement path between the pair of retro-reflectors.

In some embodiments, a local oscillator beam is frequency-offset from the measurement beam and the reference beam. A beam combiner is provided to combine the measurement beam with a measurement portion of the local oscillator beam and to combine the reference beam with a reference portion of the local oscillator beam downstream of the measurement object. A separator member is disposed downstream of the beam combiner to separate the measurement beam from the reference beam. A plurality of masks comprise a reference beam mask disposed in the reference path downstream of the separator member to block off the measurement beam and permit a portion of the reference beam and a part of the reference portion of the local oscillator beam to pass therethrough to a reference beam detector, and a measurement beam mask disposed in the measurement path downstream of the separator member to block off the reference beam and permit a portion of the measurement beam and a part of the measurement portion of the local oscillator beam to pass therethrough to a measurement beam detector.

In accordance with another aspect of the present invention, a method of reducing cyclic errors in an interferometer comprises directing a reference beam along a reference path; and directing a measurement beam along a measurement path contacting a measurement object. At least a portion of the reference and a portion of the measurement path are identical. The measurement beam is spatially separated from the reference beam. The reference beam and the measurement beam have a single frequency. The method further comprises spatially isolating the reference beam from the measurement beam to reduce cross-talk between the reference beam and the measurement beam.

In some embodiments, spatially isolating comprises placing a single mask in a common path over which the reference beam and the measurement beam overlap. The single mask blocks off a substantial portion of the reference beam which would otherwise diffract into the measurement beam and blocks off a substantial portion of the measurement beam which would otherwise diffract into the reference beam. In other embodiments, spatially isolating comprises placing a plurality of masks in the reference path and the measurement path to spatially isolate the reference beam from the measurement beam. The method may further comprise performing diffractive modeling of the reference beam and the measurement beam to determine shapes and sizes of the mask(s).

BRIEF DESCRIPTION OF THE DRAWINGS

FIG. 4 is a simplified schematic diagram of a beam launcher according to an embodiment of the present invention;

FIGS. 4A and 4B show examples of masks for masking beams to reduce cyclic error;

DETAILED DESCRIPTION OF THE INVENTION

Figure 1:
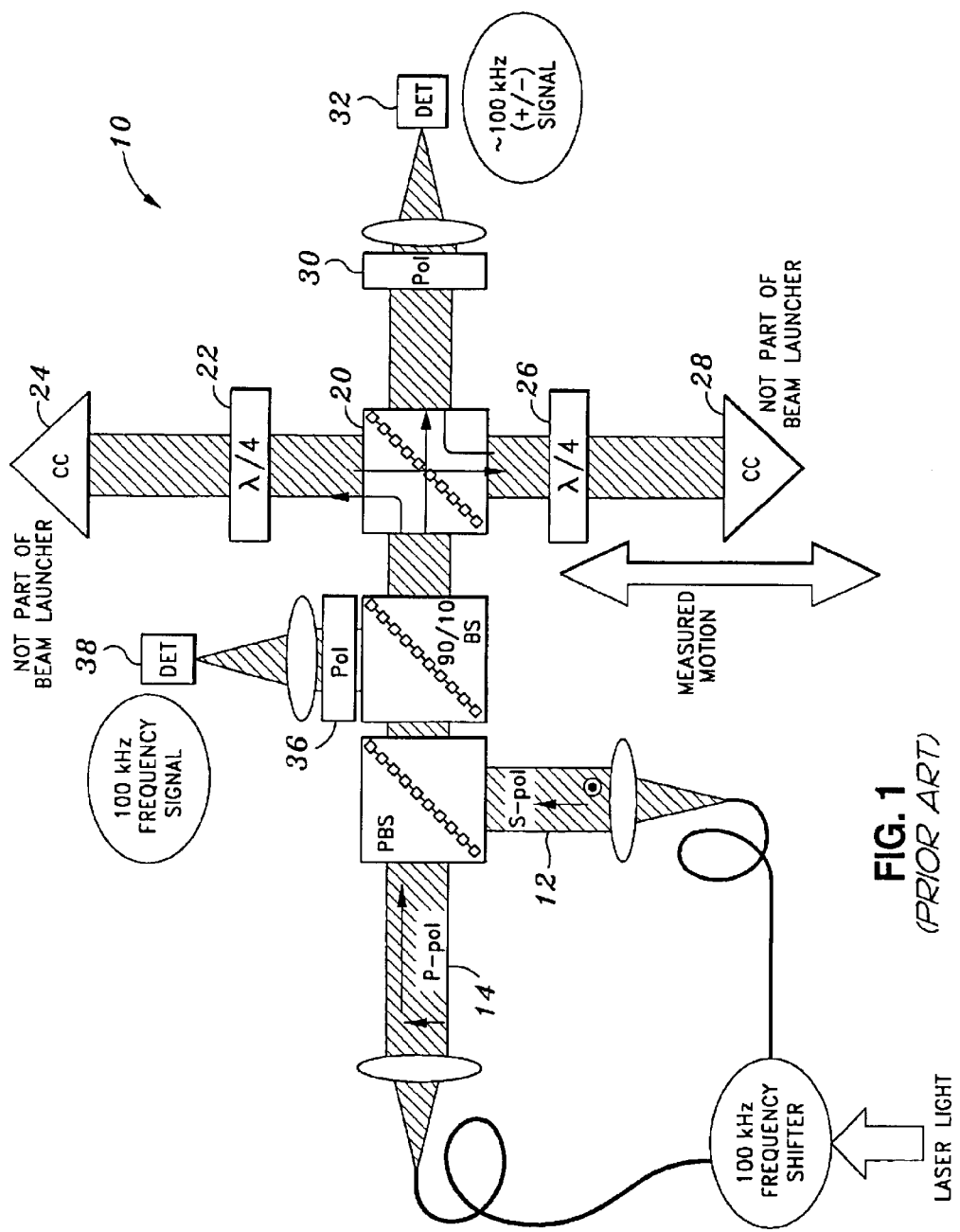
FIG. 1 is a simplified schematic diagram of a prior vertex—vertex beam launcher.
Figure 2:
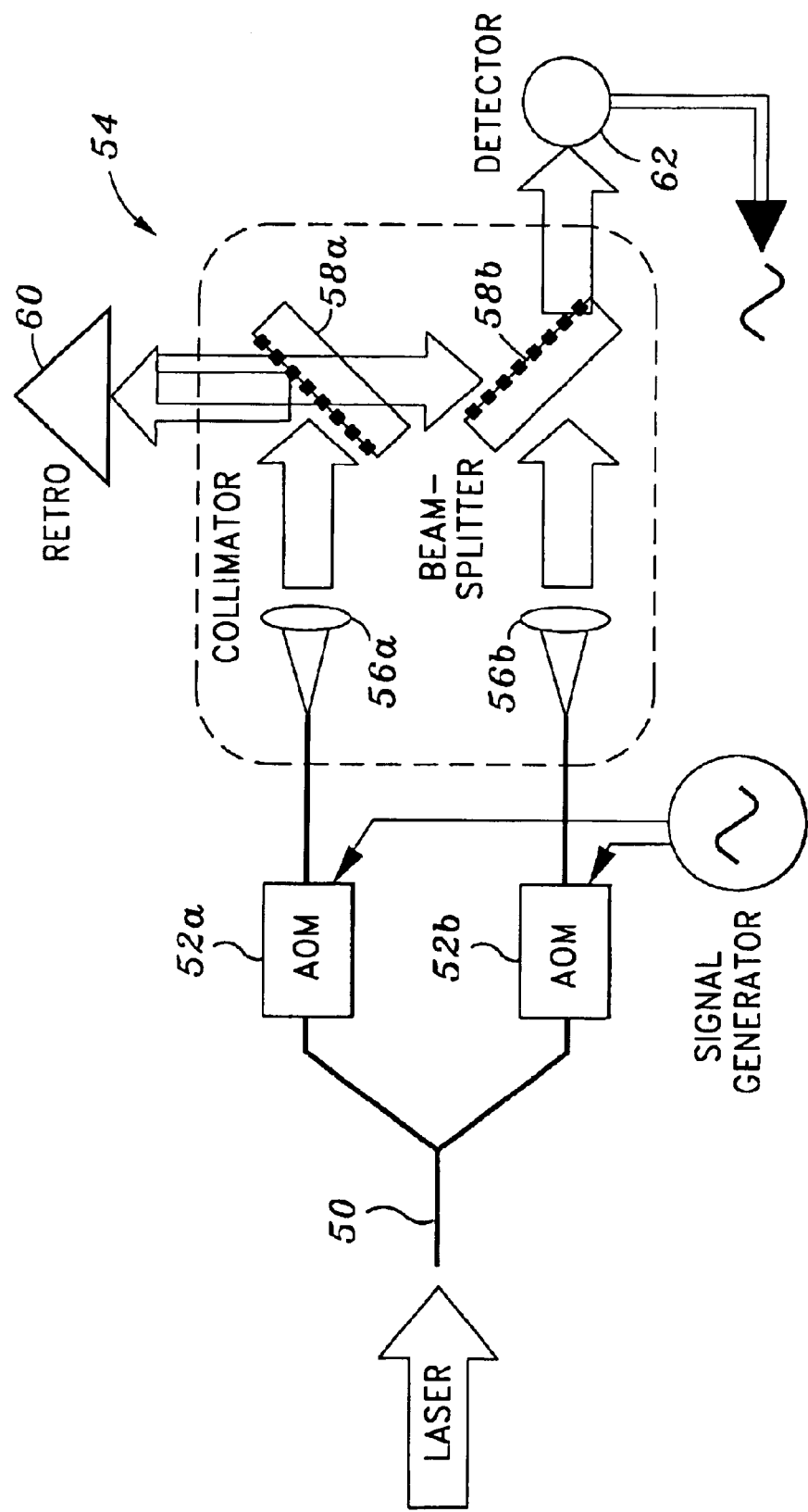
FIG. 2 is a simplified schematic diagram of a basic heterodyne interferometer.
Figure 3:
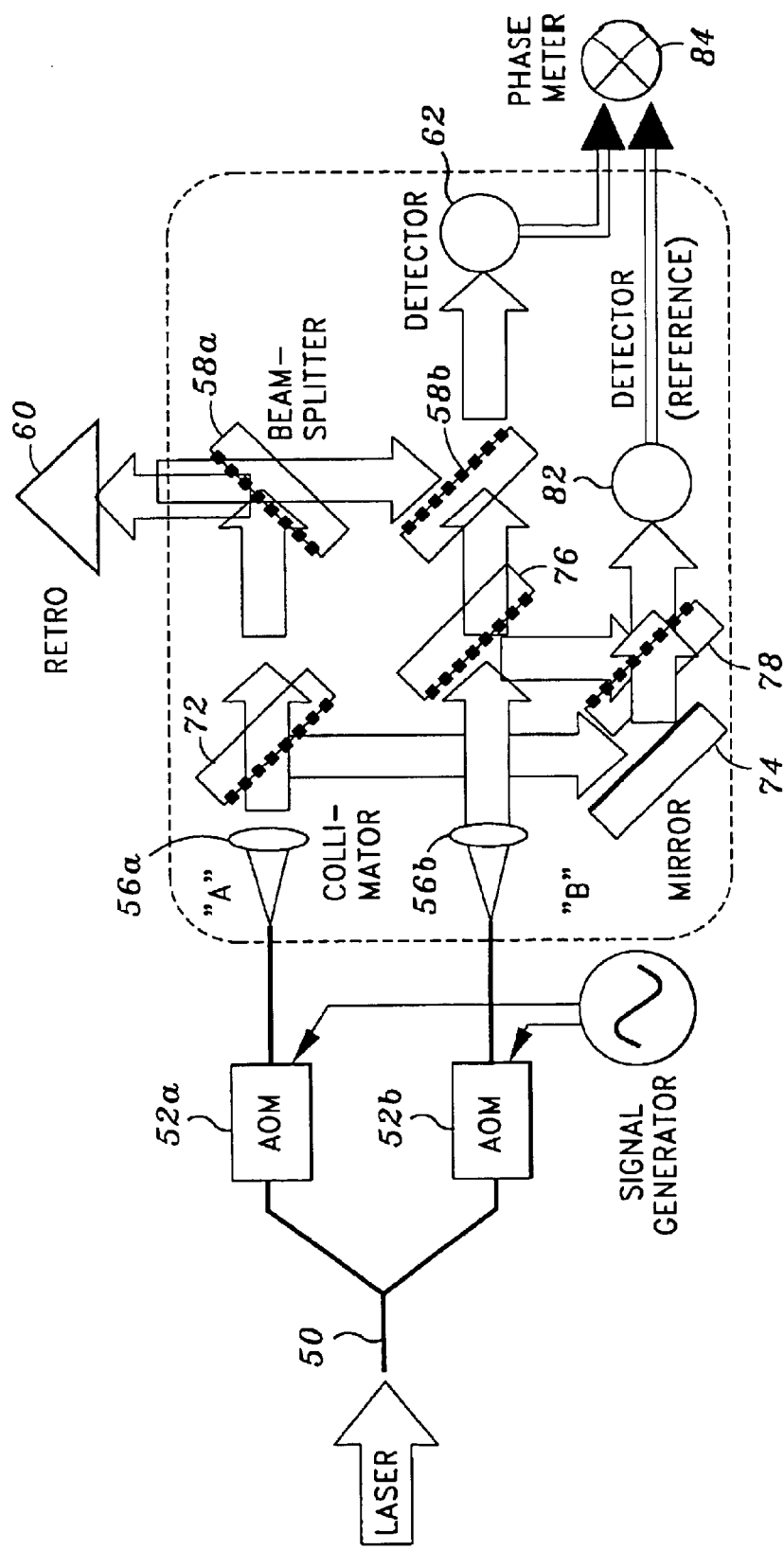
FIG. 3 is a simplified schematic diagram of another heterodyne interferometer.

FIG. 4 shows the beam paths in a beam launcher 100 according to an embodiment of the invention. One of the laser beams (beam "A") enters via a fiber 102 at the top of the sketch and is collimated by a collimator 104. The beam A hits a Double-sided Mirror 106 having a hole 107 and is reflected off to the left, to interrogate the retro "corner cube 1" (CC1). The launcher 100 has a "racetrack" configuration, i.e., the beam measures the distance between two retros by making a loop. In such a configuration, the beam goes to the first corner cube and hits it off-center; the reflected beam is offset and goes past the launcher to hit the second corner cube off to the right; and the beam reflected by that is offset again and now lines up with the entrance aperture mask "A" 110. The beam hits the back side of the Double-sided Mirror 106 and proceeds down. The light of beam "B" (the LO beam) entering via a fiber 112 is collimated by a collimator 114 and mixed with the Measurement Beam at the beam combiner 118, and the resulting heterodyne beam is sent off to lens 120 and detector "D1." FIG. 4 shows lenses, but the collimators 104, 114 for the beams are desirably parabolic reflectors (see FIG. 6).

Another portion of beam A passes through the hole 107 in the Double-sided Mirror 106 rather than making the loop, and becomes the Reference Beam. This causes a shadow in the out-going beam, as shown, although it is somewhat filled in by diffraction by the time it gets back. The Reference Beam is also mixed with the LO beam, and the resulting mix is separated off by a separator mirror 122 and sent to lens 124 and detector "D2". A pair of shallow wedges 128 form a "Risley Pair" for precise alignment.

Except for the racetrack between the retros and the very short distance through the Double-sided Mirror itself, the Measurement Beam and the Reference Beam follow the same path. This "Common Path Heterodyne Interferometer (CoPHI)" configuration allows the reference channel to measure and remove nearly every error source. Signal interference between the center reference beam and outer measurement beam produces a cyclic error so that the average signal has error that is cyclic in nature.

To keep the cyclic error acceptably small, better than 80 dB isolation is needed, and it does not matter if the source of contamination is polarization bleed-through, diffractive cross-talk, or stray reflections. Diffraction was modeled to assure that not too much of the Measurement Beam would diffract into the reference channel or vice versa by diffraction masking or beam masking. And stray-light reflections were tracked to assure that they too would not corrupt the signal. Diffraction modeling is used to predict the cyclic error of various configuration, and to optimize mask dimensions for optimal performance by balancing cross-talk power with signal power to minimize the ratio of contamination to signal. As a result, the masks are sized to block the diffracted contaminant signal while passing the desired measurement reference beams. See, e.g., Kalyan Dutta and Robert S. Benson, "Performance Modeling of Optical Metrology Systems," Proceedings of Conference on Astronomical Telescopes, Hawaii, August 2002 (to be published and attached herewith as Appendix); Joseph W. Goodman, "Introduction to Fourier Optics," 1968; Jack D. Gaskill, "Linear Systems, Fourier Transforms and Optics," 1978. These references are incorporated herein by reference.

Various masks were used to keep the Reference Beam and Measurement Beam spatially isolated. FIG. 4 shows mask C 132 which includes an aperture in the center for the Reference Beam, and mask A 110 and mask B 134 for the Measurement Beam. Mask A may be an aperture mask or another mask having a cross strip through the center, as seen in FIG. 4A. Mask B in FIG. 4B is similar to Mask A of FIG. 4A, but may have a slightly wider cross strip. The cross strip blocks off the Reference Beam in the center and removes phase-front distortion from fringes from the shadows in the Measurement Beam produced by the hole 107 of the Double-sided Mirror 106 along the racetrack path, resulting in a double-D shaped final beam. The use of the masks reduces the effects of the diffraction of the Measurement Beam on the Reference Beam and vice versa by blocking the diffracted contaminant signals while passing the desired signals, thereby reducing the cyclic error or cross-talk. For optimal performance, the dimensions of the masks can be optimized to balance cross-talk power with signal power to minimize the ratio of contamination to signal. In one example, the laser provides a 1.33 $\mu$m IR beam, the Measurement Beam has an outer diameter of about 10 mm, and the Reference Beam has an outer diameter of about 3 mm. Mask A and mask B may have the dimensions as shown in FIGS. 4A and 4B, while Mask C has an aperture of about 2 mm in diameter or less. The masks may be made of metal or the like.

Figure 5:
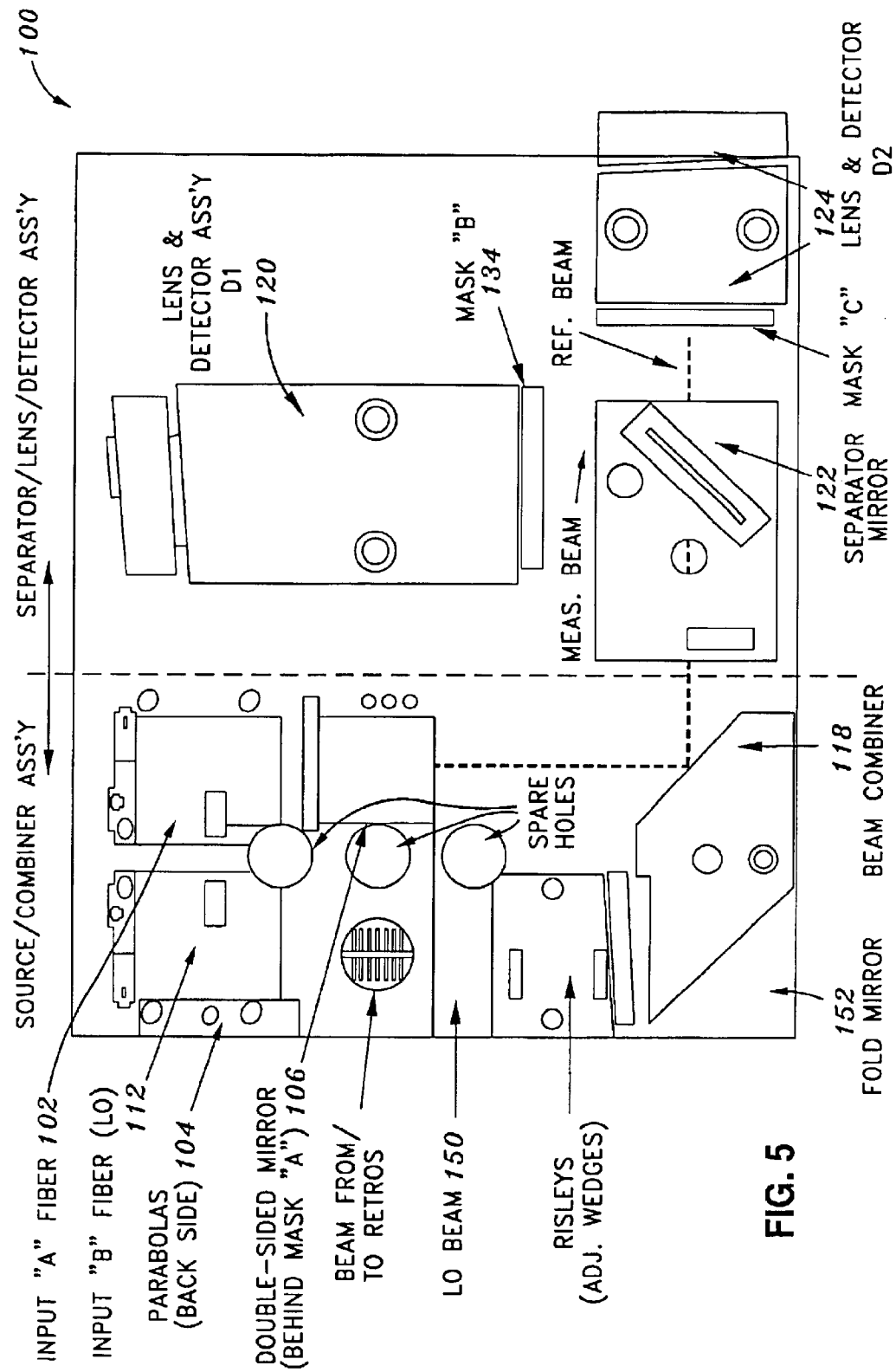
FIG. 5 is a solid-model rendering of the beam launcher of FIG. 4.

FIG. 5 shows the solid-model rendering of the beam launcher 100. The beams are collimated with parabolas 104 located on the back side. The LO beam runs down the left side of the drawing, is folded by the fold mirror 152, and then goes right along the bottom. The "A" beam entering via fiber 102 starts at the top mid-left and also travels down a distance, then hits the Double-sided Mirror 106 (behind the "mask A" holder). The Reference Beam continues through the mirror 106, but the Measurement Beam reflects off of the Double-sided Mirror 106 and heads off to Retro #1 situated behind the gauge. The Measurement Beam is offset by the retro and reflected back, passing through the left-most hole to Retro #2 situated in front of the gauge. The beam is then offset again and reflected back to the gauge, passing through Mask "A" and hitting the back side of the Double-sided Mirror 106. The Measurement and Reference Beams are now again aligned and roughly collocated, and they head down to the beam-combiner 118 to be mixed with the LO beam. The right half of the gauge has the Separator Mirror 122 (to fold the Measurement Beam while passing the Reference Beam), and two sets of masks (B and C), lenses (120, 124), and detectors (D1, D2).

Figure 6:
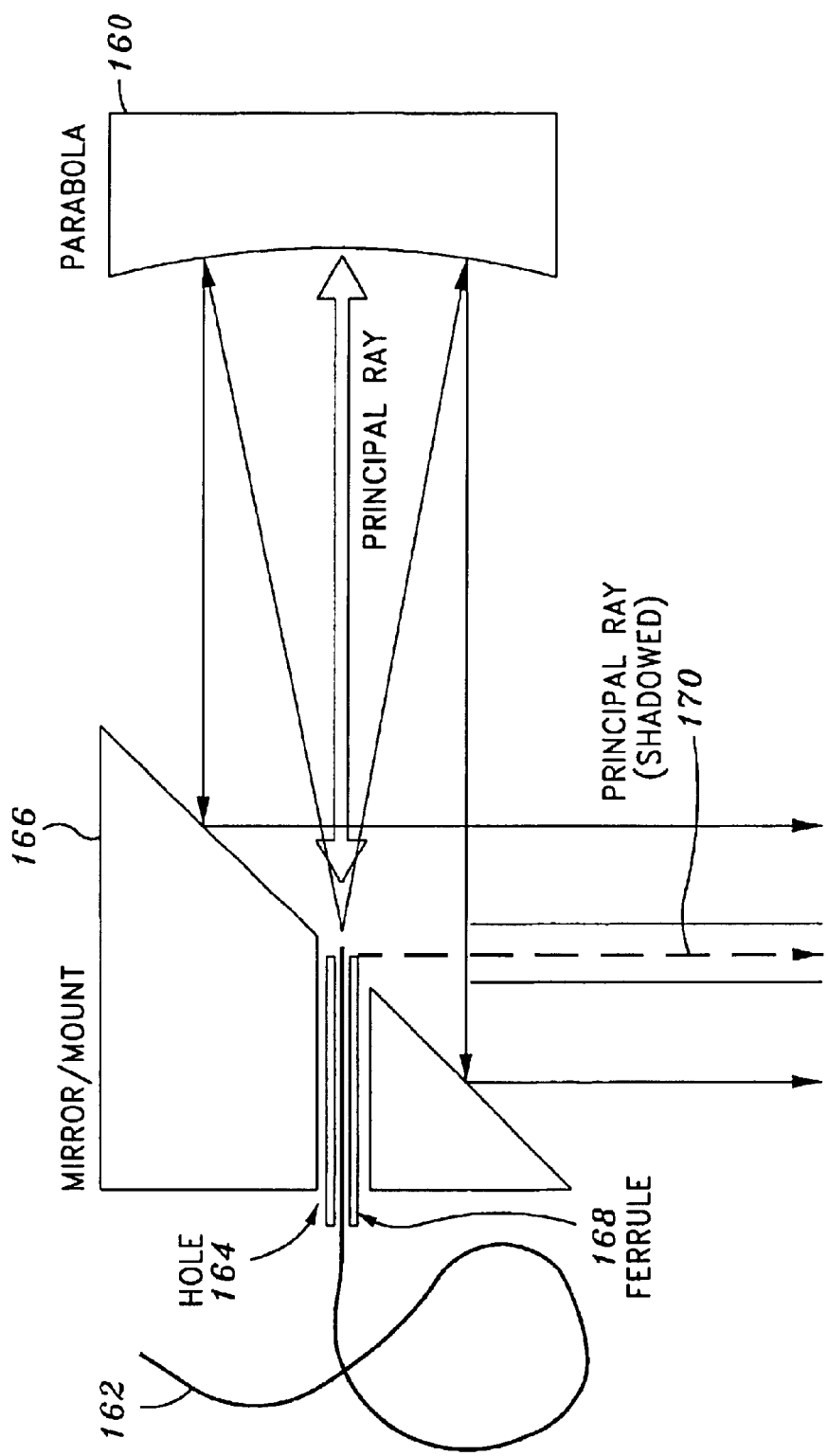
FIG. 6 is a simplified schematic diagram illustrating a collimator employing a reflective parabola.
Figure 7A:
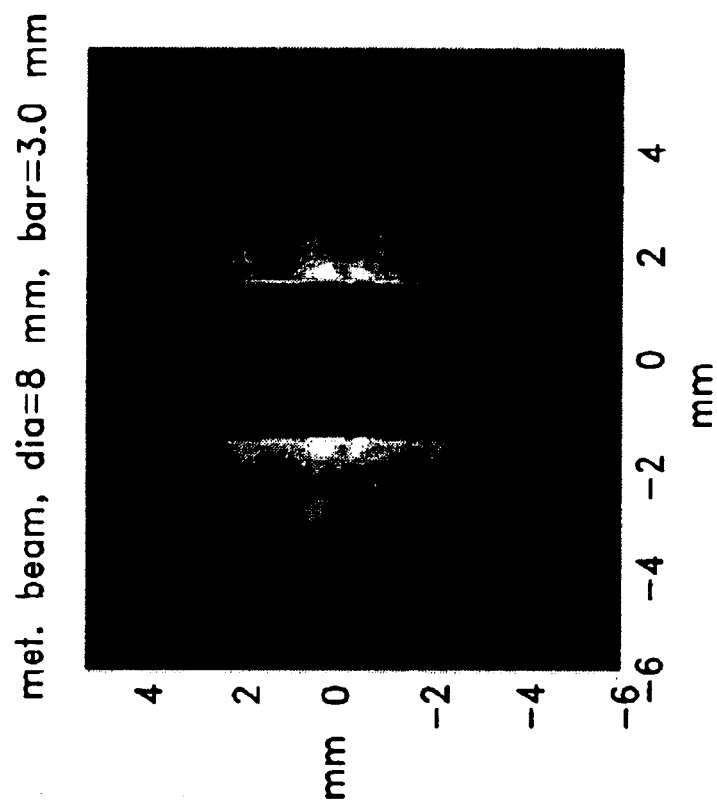
FIGS. 7A and 7B show calculated beam intensity patterns before and after masking.
Figure 7B:
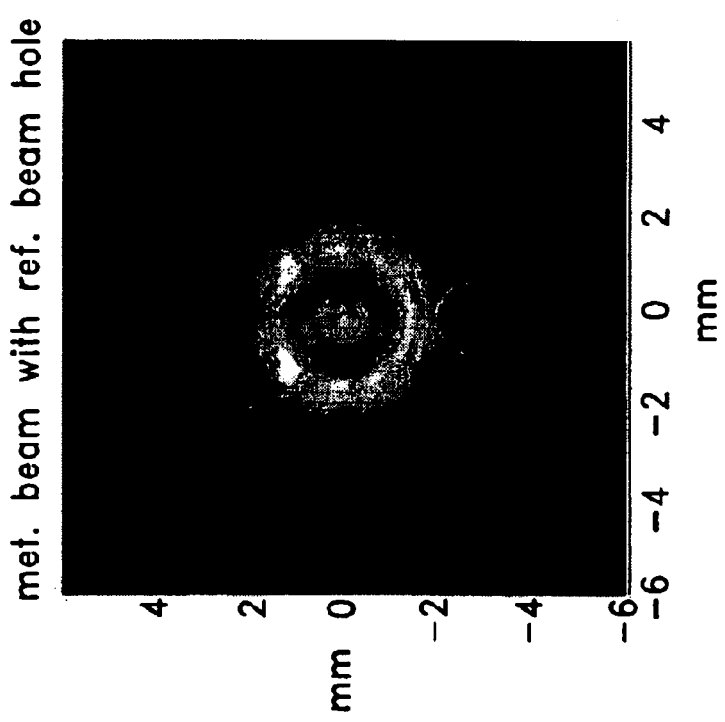

The collimators desirably use reflective parabolas 160, as seen in FIG. 6, thereby avoiding the air/vacuum refocusing issue of refractive optics. The parabolas 160 are on-axis. The end of the optical fiber 162 is placed at the focus, which is located in a hole 164 in a fold mirror 166. The light fans out to the parabola 160, is reflected back as a collimated beam, and then reflects off of the fold mirror 152 as a shadowed principal ray 170. The optical fiber 162 (and associated ferrule 168 and mirror hole 164) create a hole in the collimated beam, but since the double-sided mirror 106 also has a hole for the reference beam, the central portion of the beam is corrupted anyway and has to be masked out. FIGS. 7A and 7B show the calculated beam intensity pattern back at the double-sided mirror 106. FIG. 7A shows the pattern resulting from the shadow of the two holes (from the hole 107 of the mirror 106), while FIG. 7B shows how the beam is masked by mask B before it is directed on to the detector D1. The components in the beam launcher 100 are desirably made of zerodur or invar to minimize thermal drift.

Figure 8:
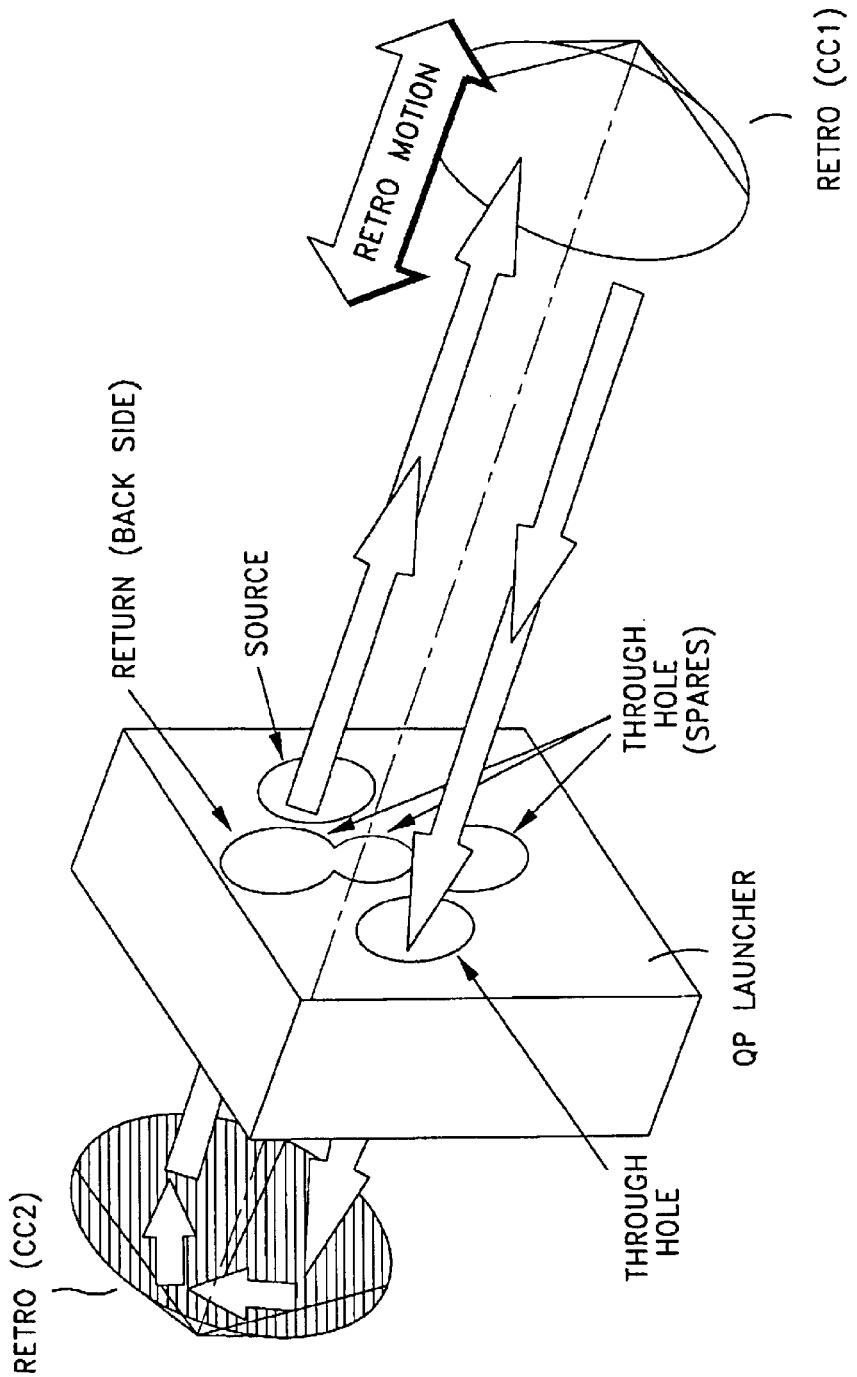
FIG. 8 is a setup with a metrology gauge for testing cyclic error.

The launcher 100 was tested to verify the source of the cyclic error in prior design iterations. One way to test for cyclic error is to use the gauge incorporating the beam launcher 100 to measure the distance between two retros, as shown in FIG. 8, and then very precisely move one of the retros and look for inconsistencies. However, if inconsistencies were uncovered, it would be unclear if it were because of cyclic error or because of an error in the precision of the retro motion.

An easier approach is to move the retro linearly at a uniform rate, and then take the Fourier transform of the resulting measurement. If the gauge is perfect and the motion perfectly uniform, the measurement would change uniformly and the Fourier transform would be smooth. Any errors in the motion show up as various bumps or dips in the transform, but the cyclic error shows up at only those frequencies corresponding to the velocity of the retro divided by half the laser wavelength.

Figure 9:
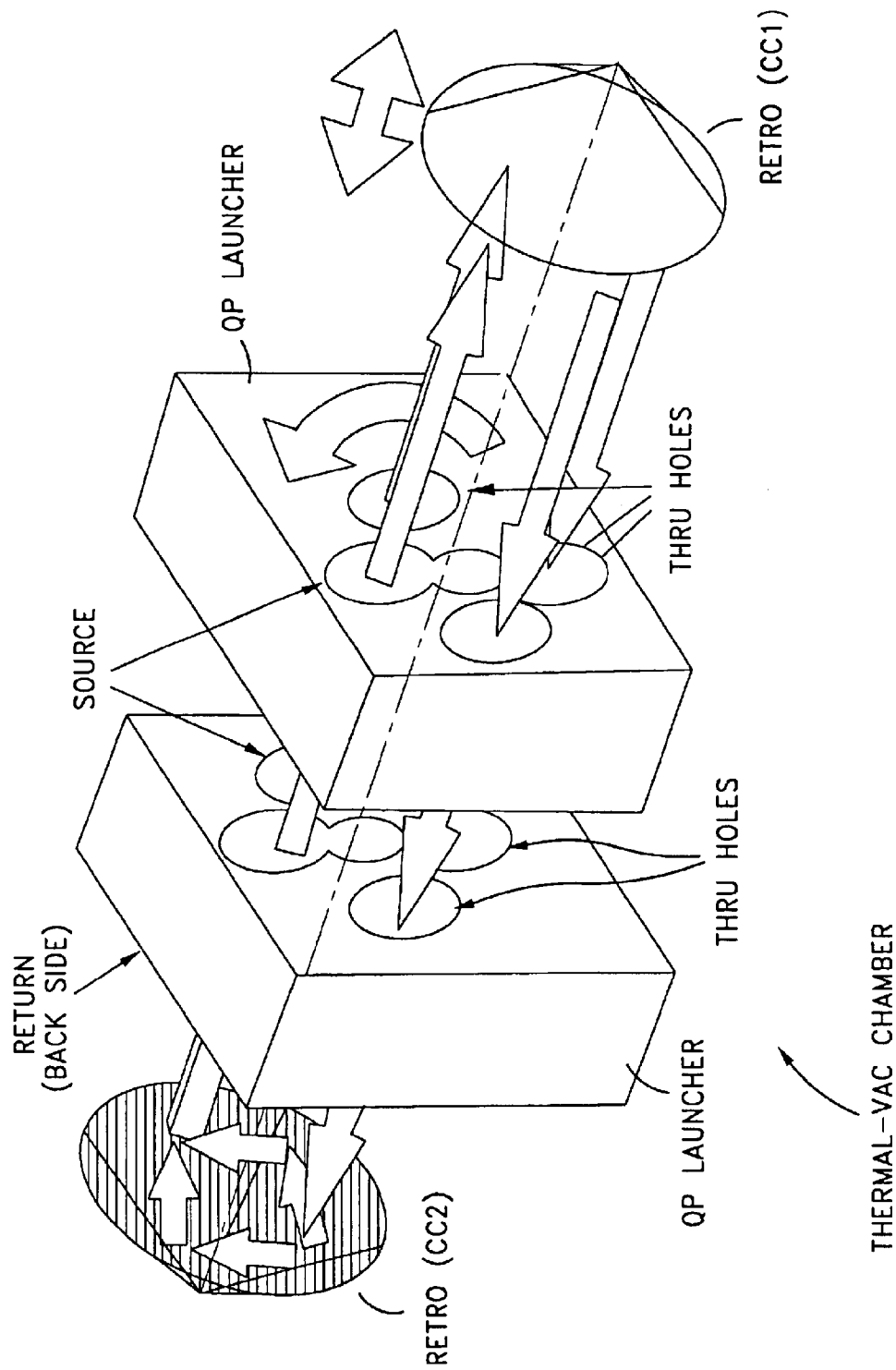
FIG. 9 is another setup with two metrology gauges for testing cyclic error.

The beam launchers (referred to as QP1 and QP2 launchers) are configured so that two gauges can simultaneously measure the distance between retros, as shown in FIG. 9. The second gauge is rotated 90° relative to the first, and each gauge's beam loops out and back through the spare holes in the other gauge. Both gauges measure the distance as the retro is moved, and the difference of these measurements is then Fourier transformed. The irregularities in retro motion are common to both measurements and are substantially removed by the differencing, but the cyclic errors each have an arbitrary phase and in general do not cancel out.

Figure 10:
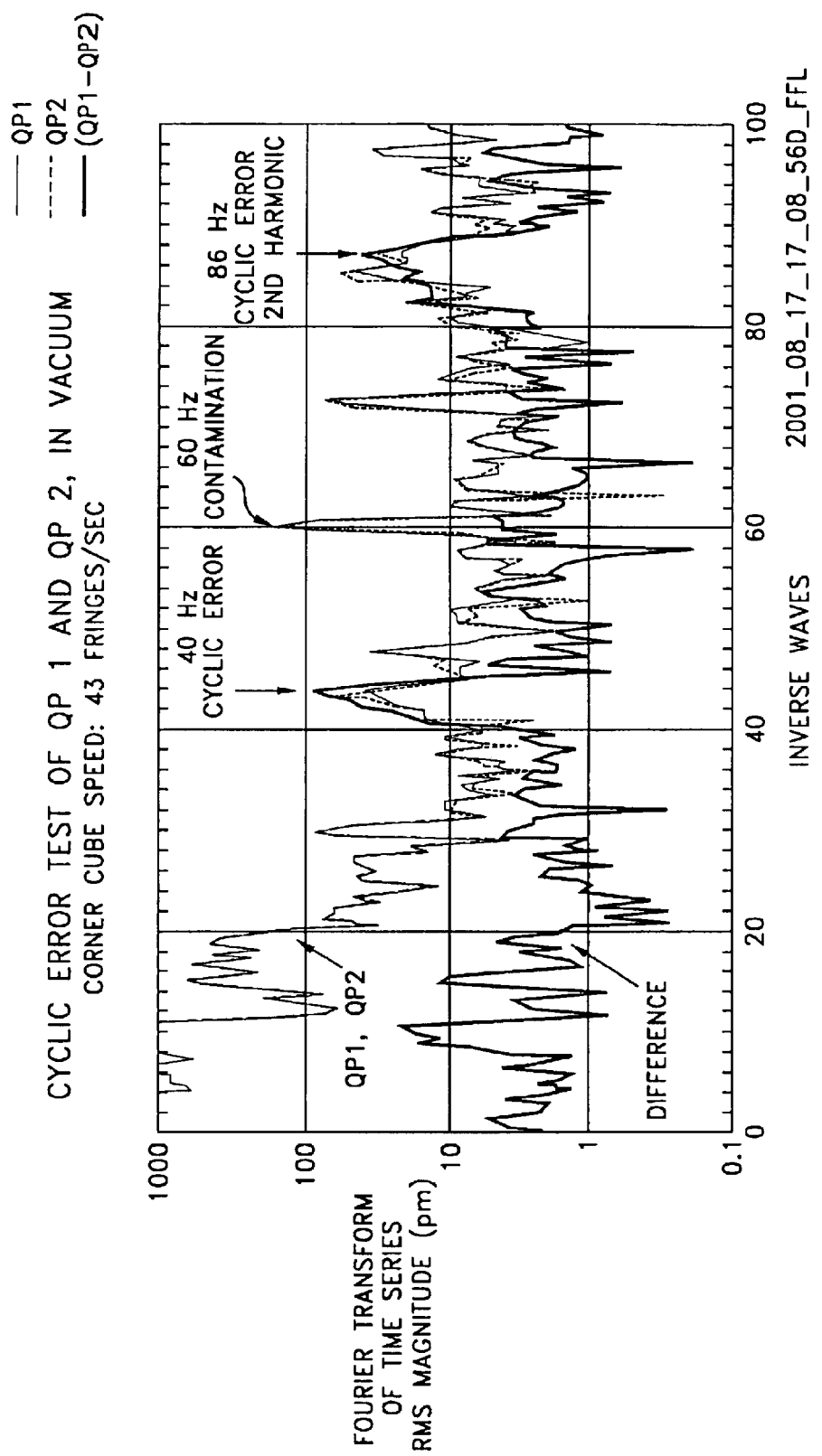
FIG. 10 shows a Fourier transform of an early set of test measurements using the setup of FIG. 9.

FIG. 10 shows the Fourier transform of an early set of test measurements. The retro was moved at a rate that generates the cyclic error at 43 Hz. As can be seen in the curves, there is a peak at that frequency in the reading from each gauge and in the difference. The measurements indicate that the cyclic error is below 100 pm rms, which was the goal of this experiment. Later detailed analyses indicated that some of the cyclic error resulted from electronic cross-talk, and once that was eliminated, the measured cyclic error was found to be roughly 25 pm rms.

The diffraction model that generated the beam patterns of FIGS. 7A and 7B also calculated the leakage of the Reference Beam into the measurement channel and the Measurement beam into the reference channel. The model then calculated the mixing efficiencies, and from those the expected cyclic error. The model indicated that the "as-built" launcher should have a cyclic error of about 25 pm rms. This validated the model, and also indicated that the setup did not have any other contributors to the cyclic error, such as from scattered stray light. The model was then used to optimize various mask dimensions to further reduce the cyclic error while still maintaining adequate laser power on the detectors.

The beam launchers of the present invention are suitable for a number of demonstration test-beds and for other purposes. The launchers have been used to demonstrate that the cyclic error is understood and can be controlled to satisfactory resolution.

The above-described arrangements of apparatus and methods are merely illustrative of applications of the principles of this invention and many other embodiments and modifications may be made without departing from the spirit and scope of the invention as defined in the claims. For instance, the masking scheme to reduce or eliminate cyclic error can be applied to other beam launcher configurations, such as those producing concentric beams or separate parallel measurement beam and reference beam or the like. The one or more masks may have other shapes and sizes, and may be positioned at various locations along the beam path, as long as the mask or each mask blocks out a sufficient amount of the cross-talk or diffracted contaminant signal and allows the intended portion of the beam to pass therethrough.

Figure 11:
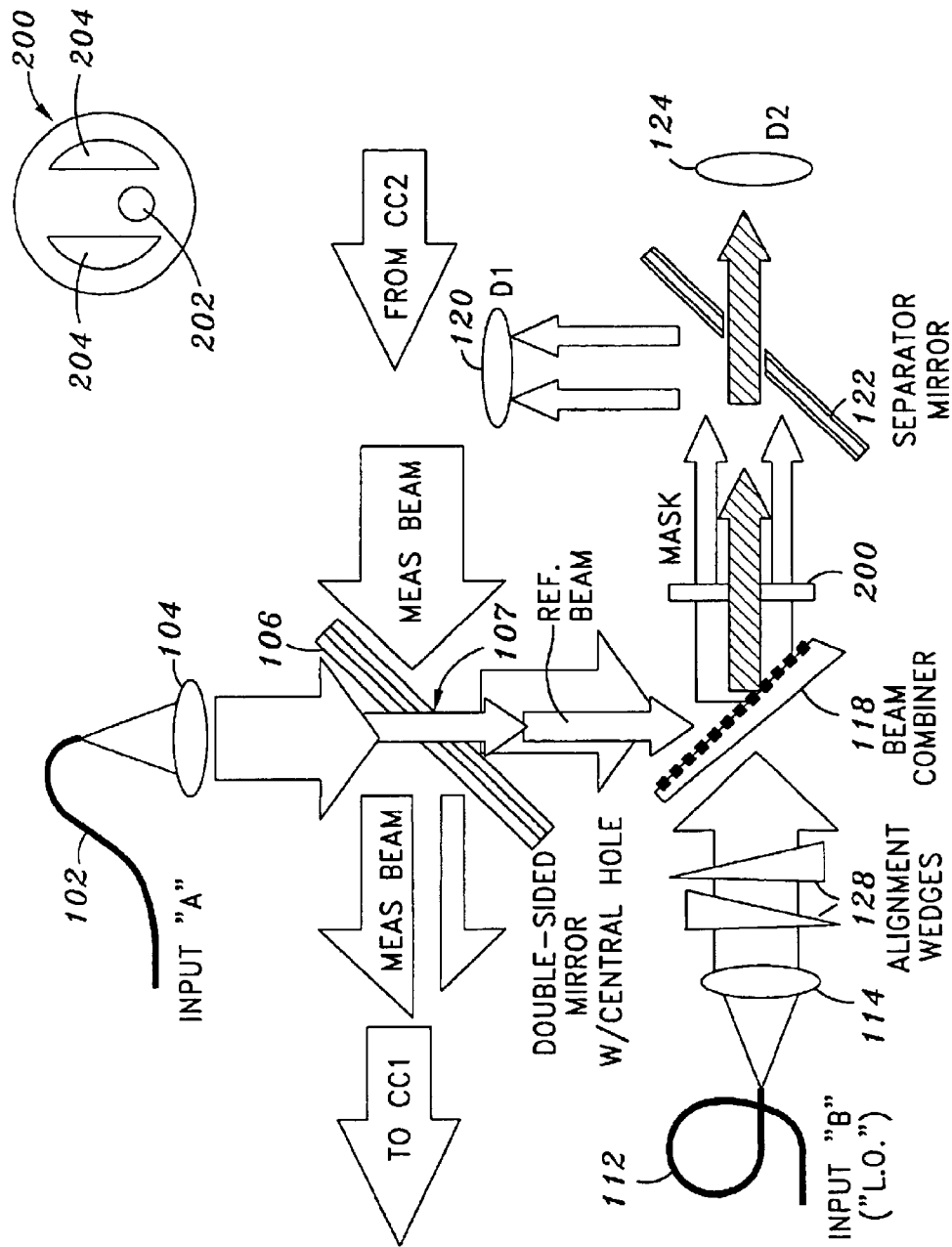
FIG. 11 is a simplified schematic diagram of a bean launcher employing a single mask according to another embodiment of the present invention.
Figure 12:
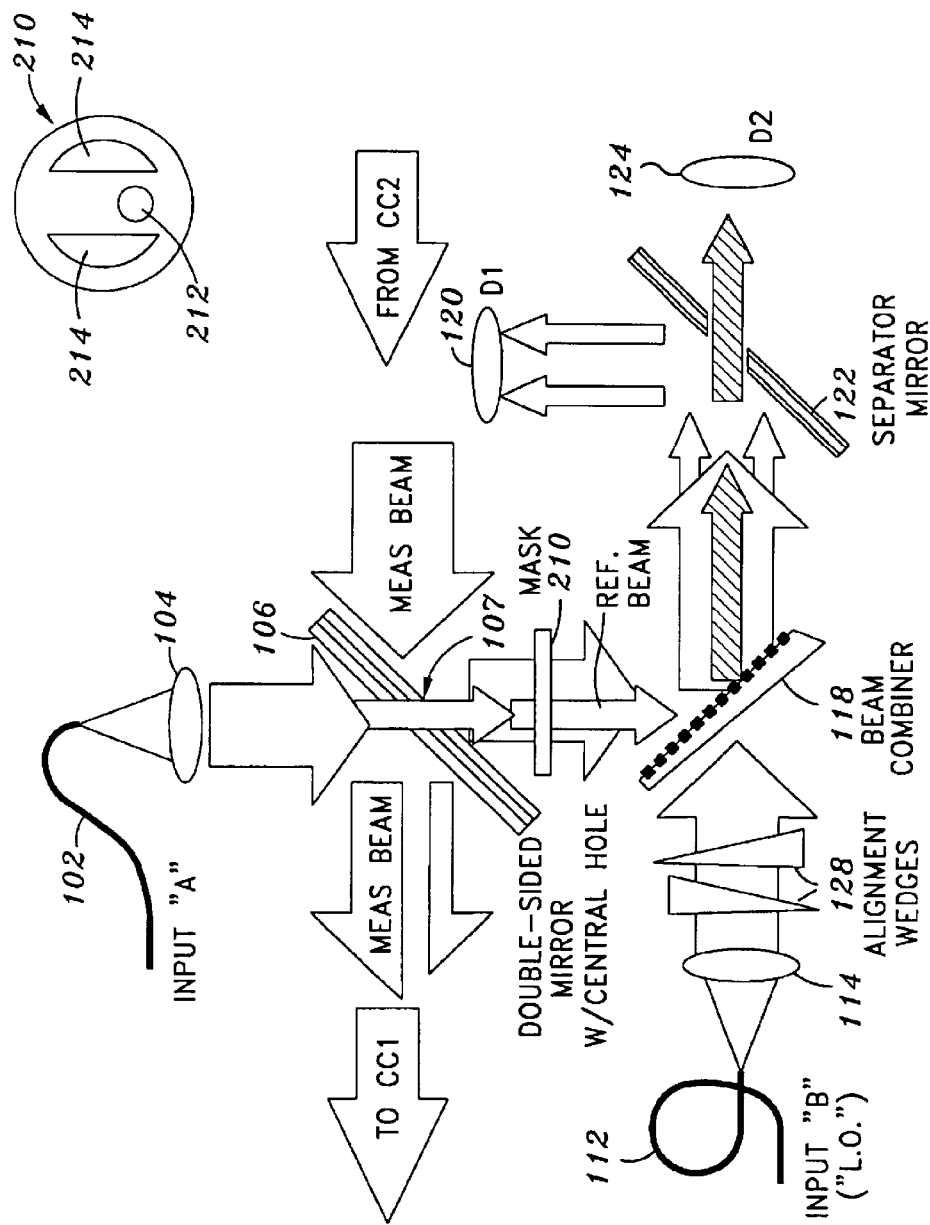
FIG. 12 is a simplified schematic diagram of a beam launcher employing a single mask according to another embodiment of the present invention.

Different mask(s) or additional masks may be provided along the measurement and reference beam paths. FIGS. 11 and 12 show examples of placing a single mask in the common path of the measurement beam and reference beam. In FIG. 11, a single mask 200 is placed in the common path between the beam combiner 118 and the separator mirror 122. The mask 200 permits the reference beam and the reference portion of the local oscillator beam to pass through an aperture 202 and blocks off a significant portion of the reference beam that would otherwise diffract into the measurement beam. The mask 200 further permits the measurement beam and the measurement portion of the local oscillator beam to pass through a pair of D-shaped openings 204 and blocks off a significant portion of the reference beam that would otherwise diffract into the reference beam. In FIG. 12, a single mask 210 is placed in the common path between the double-sided mirror 106 and the beam combiner 118. The single mask 210 includes an aperture 212 and a pair of D-shaped openings 214, and serves a similar function as the mask 200 in FIG. 11 in substantially isolating the reference beam and the measurement beam and reducing diffractive effects on one another.

The scope of the invention should, therefore, be determined not with reference to the above description, but instead should be determined with reference to the appended claims along with their full scope of equivalents.

What is claimed is:

1. An interferometry apparatus comprising:
   a reference beam directed along a reference path;
   a measurement beam, said measurement beam being spatially separated from the reference beam when cycling along a measurement path contacting a a pair of corner cube retro-reflectors spaced from one another, the reference beam and the measurement beam having a single frequency, at least a portion of the reference beam and at least a portion of the measurement beam overlapping along a common path; and one or more masks disposed in the common path or in the reference path and the measurement path to spatially isolate the reference beam and the measurement beam from one another.

2. The interferometry system of claim 1 wherein a single mask is disposed in the common path to block off a substantial portion of the reference beam which would otherwise diffract into the measurement beam and to block off a substantial portion of the measurement beam which would otherwise diffract into the reference beam.

3. The interferometry system of claim 1 wherein a plurality of masks comprise a reference beam mask disposed in the reference path to block off the measurement beam and permit a portion of the reference beam to pass therethrough, and a measurement beam mask disposed in the measurement path to block off the reference beam and permit a portion of the measurement beam to pass therethrough.

4. The interferometry system of claim 3 wherein the reference beam mask comprises an aperture for an inner reference beam, and wherein the measurement beam mask comprises a pair of apertures disposed on opposite sides of a center separated by a center strip for an annular measurement beam.

5. The interferometry system of claim 4 wherein the pair of apertures of the measurement beam mask are D-shaped apertures symmetrically disposed with respect to the center strip.

6. The interferometry system of claim 1 further comprising a double-sided mirror disposed between the pair of retro-reflectors, the double-sided mirror including an aperture at or near a center for the reference beam to pass therethrough along the reference path.

7. The interferometry system of claim 1 wherein the measurement path and the reference path are substantially identical except for the portion of the measurement path between the pair of retro-reflectors.

8. The interferometry system of claim 1 further comprising a local oscillator beam which is frequency-offset from the measurement beam and the reference beam; and a beam combiner to combine the measurement beam with a measurement portion of the local oscillator beam and to combine the reference beam with a reference portion of the local oscillator beam downstream of the measurement object.

9. The interferometry system of claim 8 further comprising a separator member disposed downstream of the beam combiner to separate the measurement beam from the reference beam.

10. The interferometry system of claim 9 wherein a plurality of masks comprise a reference beam mask disposed in the reference path downstream of the separator member to block off the measurement beam and permit a portion of the reference beam and a part of the reference portion of the local oscillator beam to pass therethrough to a reference beam detector, and a measurement beam mask disposed in the measurement path downstream of the separator member to block off the reference beam and permit a portion of the measurement beam and a part of the measurement portion of the local oscillator beam to pass therethrough to a measurement beam detector.

11. The interferometry system of claim 9 wherein a single mask is disposed in the common path downstream of the beam combiner to block off a substantial portion of the reference beam which would otherwise diffract into the measurement beam and to block off a substantial portion of the measurement beam which would otherwise diffract into the reference beam, the single mask permitting a portion of the reference beam and a part of the reference portion of the local oscillator beam to pass therethrough to a reference beam detector and permitting a portion of the measurement beam and a part of the measurement portion of the local oscillator beam to pass therethrough to a measurement beam detector.

12. The interferometry system of claim 9 wherein the separator member comprises a separator mirror including an aperture for the reference beam and the reference portion of the local oscillator beam to pass therethrough to a reference beam detector and a reflective surface to reflect the measurement beam and the measurement portion of the local oscillator beam to a measurement beam detector.

13. A method of reducing cyclic errors in an interferometer, the method comprising:

directing a reference beam along a reference path;

directing a measurement beam to interrogate a distance between a pair of corner cube retro-reflectors spaced from one another, said measurement beam being spatially separated from the reference beam when cycling along a measurement path contacting the pair of corner cube retro-reflectors, at least a portion of the reference path and a portion of the measurement path being identical, the reference beam and the measurement beam having a single frequency; and spatially isolating the reference beam from the measurement beam to reduce cross-talk between the reference beam and the measurement beam.

14. The method of claim 13 wherein spatially isolating comprises placing a single mask in a common path over which the reference beam and the measurement beam overlap, the single mask blocking off a substantial portion of the reference beam which would otherwise diffract into the measurement beam and to block off a substantial portion of the measurement beam which would otherwise diffract into the reference beam.

15. The method of claim 13 wherein spatially isolating comprises placing a plurality of masks in the reference path and the measurement path to spatially isolate the reference beam from the measurement beam.

16. The method of claim 15 further comprising performing diffractive modeling of the reference beam and the measurement beam to determine shapes and sizes of the plurality of masks.

17. The method of claim 15 wherein spatially isolating comprises placing a reference beam mask in the reference path to block off the measurement beam and permit a portion of the reference beam to pass therethrough; and placing a measurement beam mask in the measurement path to block off the reference beam and permit a portion of the measurement beam to pass therethrough.

18. The method of claim 17 wherein the reference beam mask comprises an aperture for an inner reference beam, and wherein the measurement beam mask comprises a pair of apertures disposed on opposite sides of a center separated by a center strip for an annular measurement beam.

19. The method of claim 13 wherein the reference beam and the measurement beam are directed toward a double-sided mirror disposed between the pair of retro-reflectors, the double-sided mirror including an aperture at or near a center for the reference beam to pass therethrough along the reference path.

20. The method of claim 19 wherein the measurement beam mask is disposed between the pair of retro-reflectors.

21. The method of claim 20 wherein spatially isolating comprises, after combining the measurement beam with the measurement portion of the local oscillator beam and combining the reference beam with the reference portion of the local oscillator beam:

placing a reference beam mask in the reference path to block off the measurement beam and the measurement portion of the local oscillator beam and to permit a portion of the reference beam and a part of the reference portion of the local oscillator beam to pass therethrough; and placing a measurement beam mask in the measurement path to block off the reference beam and the reference portion of the local oscillator beam and to permit a portion of the measurement beam and a part of the measurement portion of the local oscillator beam to pass therethrough.

22. The method of claim 13 wherein the measurement beam and the reference beam are directed along substantially identical paths except for the portion of the measurement path between the pair of retro-reflectors.

23. The method of claim 13 further comprising providing a local oscillator beam which is frequency-offset from the measurement beam and the reference beam; and combining the measurement beam with a measurement portion of the local oscillator beam and combining the reference beam with a reference portion of the local oscillator beam downstream of the measurement object.

* * * * *